United States Patent
Wang et al.

(10) Patent No.: US 11,518,493 B2
(45) Date of Patent: Dec. 6, 2022

(54) SEALER FOR MITIGATING LEAKAGE ON A VEHICLE

(71) Applicant: Gulfstream Aerospace Corporation, Savannah, GA (US)

(72) Inventors: Tongan Wang, Savannah, GA (US); Christine Applegren, Savannah, GA (US); Knut Pedersen, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

(21) Appl. No.: 17/248,525

(22) Filed: Jan. 28, 2021

(65) Prior Publication Data

US 2021/0316836 A1   Oct. 14, 2021

Related U.S. Application Data

(60) Provisional application No. 63/009,558, filed on Apr. 14, 2020.

(51) Int. Cl.
*B33Y 80/00* (2015.01)
*B64C 1/40* (2006.01)
*F16J 15/02* (2006.01)

(52) U.S. Cl.
CPC ............... *B64C 1/40* (2013.01); *B33Y 80/00* (2014.12); *F16J 15/027* (2013.01)

(58) Field of Classification Search
CPC .......... B64C 1/40; B33Y 80/00; F16J 15/027
See application file for complete search history.

(56) References Cited

U.S. PATENT DOCUMENTS

| 9,919,791 B2* | 3/2018 | Autry ..................... B64C 3/187 |
| 2012/0037449 A1 | 2/2012 | Ayle |
| 2017/0058689 A1 | 3/2017 | Gaebler et al. |

* cited by examiner

*Primary Examiner* — Rick K Chang
(74) *Attorney, Agent, or Firm* — LKGlobal | Lorenz & Kopf, LLP

(57) ABSTRACT

Sealers and methods for making a sealer are provided. In one example, the sealer includes an exterior wall extending in a longitudinal direction and at least partially surrounding a first channel. A first plurality of interior walls are spaced apart from each other and are disposed in the first channel transverse to the longitudinal direction to subdivide the first channel into a first plurality of cells.

18 Claims, 5 Drawing Sheets

SEALER FOR MITIGATING LEAKAGE ON A VEHICLE

CROSS-REFERENCE TO RELATED APPLICATIONS

This application is related to and claims all available benefit of U.S. Provisional Patent Application 63/009,558 filed Apr. 14, 2020, the entire contents of which are herein incorporated by reference.

TECHNICAL FIELD

The technical field relates generally to sealing, and more particularly, relates to sealers for mitigating leakage on a vehicle, such as, for example, an aircraft.

BACKGROUND

Sealing various areas of vehicles to mitigate acoustic, thermal, and/or airflow leakage or the like is important to many vehicle manufacturers and their customers. Due to manufacturing tolerances, gaps exist at interfaces between many of the vehicle structures. These gaps can be a concern. For example, when designing an interior portion (e.g., cabin or other interior areas within the fuselage) of an aircraft, aircraft manufacturers develop very refined designs to meet customer expectations such as comfort, aesthetics, functionality, and the like. However, gaps at the interfaces between some of the interior aircraft trim, components, furniture, equipment, and/or other structures may not only be objectionable from an aesthetic standpoint but also because they allow for various types of leakage that can negatively impact occupant comfort, functionality, and/or the like.

Further, vehicles such as aircraft are designed to handle a variety of loads during flight including wing lift and internal cabin pressure. When an aircraft is in flight, the aircraft including the fuselage, cabin floor and other structure(s) can change shape in response to these flight loads. However, when such shape changes occur, interior structures attached directly or indirectly to the fuselage and/or cabin floor can move, causing gaps between various interior structures to open, contract, or otherwise change, thereby resulting in or increasing acoustic, thermal, and/or airflow leakage. Additionally, current methods for sealing gaps such as via tape, foam, Isodamp®, or the like are ad-hoc and/or "Band-Aid" type fixes that are inadequate to fully mitigate leakage particularly through gaps that can change or otherwise vary, for example during flight of the aircraft or the like.

Accordingly, it is desirable to provide a sealer that addresses one or more of the foregoing issues and methods for making a sealer. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a sealer and a method for making a sealer are provided herein.

In a first non-limiting embodiment, the sealer includes, but is not limited to, an exterior wall extending in a longitudinal direction and at least partially surrounding a first channel. The sealer further includes, but is not limited to, a first plurality of interior walls that are spaced apart from each other and that are disposed in the first channel transverse to the longitudinal direction to subdivide the first channel into a first plurality of cells.

In another non-limiting embodiment, the method includes, but is not limited to, forming an exterior wall by an additive process. The exterior wall extends in a longitudinal direction and at least partially surrounds a first channel. The method further includes, but is not limited to, forming a plurality of interior walls by the additive process. The interior walls are spaced apart from each other and are disposed in the first channel transverse to the longitudinal direction to subdivide the first channel into a first plurality of cells.

BRIEF DESCRIPTION OF THE DRAWINGS

The various embodiments will hereinafter be described in conjunction with the following drawing FIGS., wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to sealers and methods for making sealers. The exemplary embodiments taught herein provide a sealer having an exterior wall extending in a longitudinal direction and at least partially surrounding a first channel. As used herein, the term "longitudinal direction" is understood to mean the direction of elongation of the sealer and may be a linear direction, for example in the case of a substantially straight sealer, or may be a variable direction, for example in the case of a curved, bent or non-linear sealer. The first channel is, for example, an elongated hollowed portion (e.g., elongated space) hat is defined by an interior surface of the sealer. Interior walls of a first plurality of interior walls are spaced apart from each other and are disposed in the first channel transverse to the longitudinal direction to subdivide the first channel into a first plurality of cells. In an exemplary embodiment, the interior walls divide the channel into closed cells. The sealer is, for example, made of a flexible, elastic and/or viscoelastic material that allows the sealer to be squeezed or otherwise held in a gap. This gap may present between two objects, components, and/or items that separate a first interior space (e.g., first interior area) from a second interior space (e.g., second interior area).

Advantageously, in an exemplary embodiment, by providing a sealer having interior walls that subdivide the first channel into a first plurality of cells, leakages such as thermal leakage, sound or acoustical leakage, airflow or fluid leakage, and/or light leakage are efficiently reduced, minimized, prevented and/or obstructed from passing through the sealer. As such, leakage is prevented and/or obstructed from passing from an interior space through the gap and into another interior space(s). Additionally, in an exemplary embodiment, by providing a sealer having an elongated hollowed portion(s) and making the sealer of a flexible, elastic and/or viscoelastic material allows the sealer to be disposed in differently sized gaps or gaps that fluctuate in size or in environments having temperature, pressure, and/or humidity fluctuations while still maintaining a seal that prevents and/or obstructs leakage. For example, the sealer can be disposed in vehicles such as aircraft in gaps such as those proximate machinery or equipment that produce sound, thermal variations, pressure variations, and/or vibrations as a mitigation approach to provide a quieter and/or more comfortable environment for the vehicle occupants.

Figure 1:
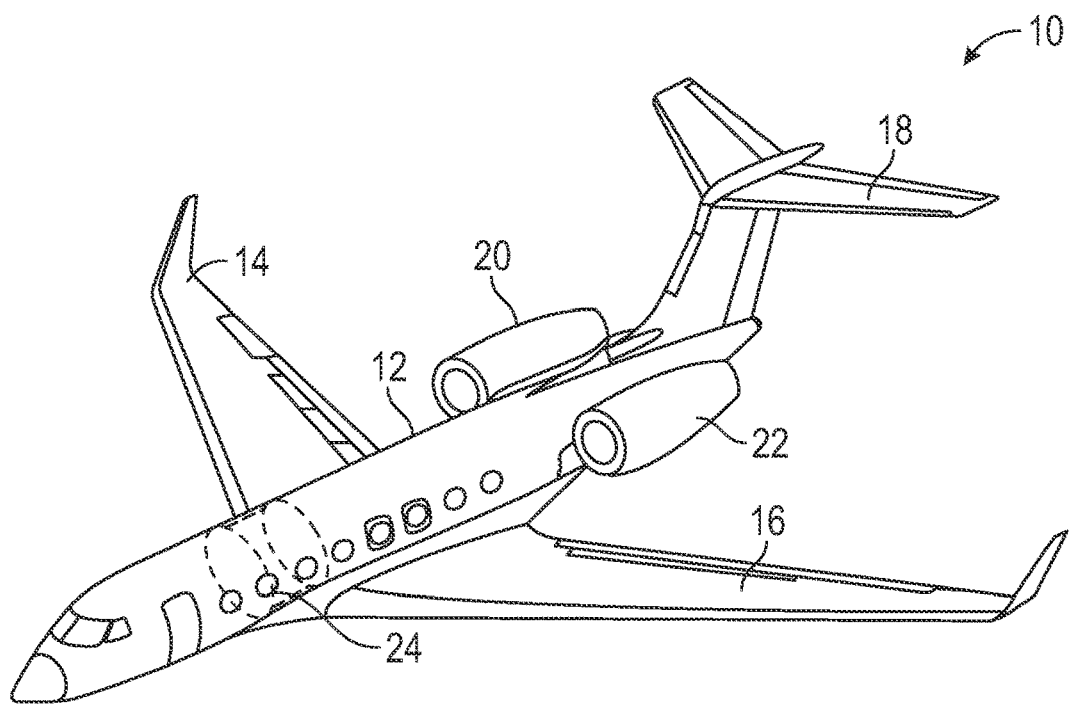
FIG. 1 illustrates a perspective view of an aircraft in accordance with an exemplary embodiment.

FIG. 1 illustrates a perspective view of an aircraft 10 in accordance with an exemplary embodiment. The aircraft 10 includes a fuselage 12 as the main body of the aircraft 10 that supports the wings 14, 16 and tail 18. Depending on the design of the aircraft 10, the engines 20, 22 may be attached to the fuselage 12 or the wings 14 and/or 16. The primary purpose of the fuselage 12 is to carry passengers and their cargo. The fuselage 12 has an interior portion 24 that includes a cabin and floor and various components, furnishings, structures, and/or the like that are disposed in the interior portion 24 directly or indirectly coupled to the floor, fuselage walls, and/or other aircraft structure. For example, referring also to FIGS. 3A and 3B, the interior portion 24 includes objects 26a and 28a, or 26b and 28b that are spaced apart to define a gap 30a or 30b that fluidly couples or connects interior spaces or areas 32 and 34 of the interior portion 24. The gaps 30a and 30b allow leakage (e.g., acoustic, thermal, and/or airflow leakage or the like) between the interior spaces 32 and 34. In an exemplary embodiment, leakage in the interior portion 24 contributes to excessive or undesirable noise levels in the aircraft interior, and/or other types of undesirable leakage such as thermal or airflow, which if mitigated would help to provide a more desirable environment in the aircraft 10 (e.g., noise, temperature and/or the like). Although FIG. 1 illustrates an aircraft 10, it is to be understood that various alternate embodiments may include a vehicle other than an aircraft having a vehicle structure with an interior portion that includes objects and/or components that define a gap therebetween allowing leakage between interior spaces/areas of the interior portion.

Figure 2A:
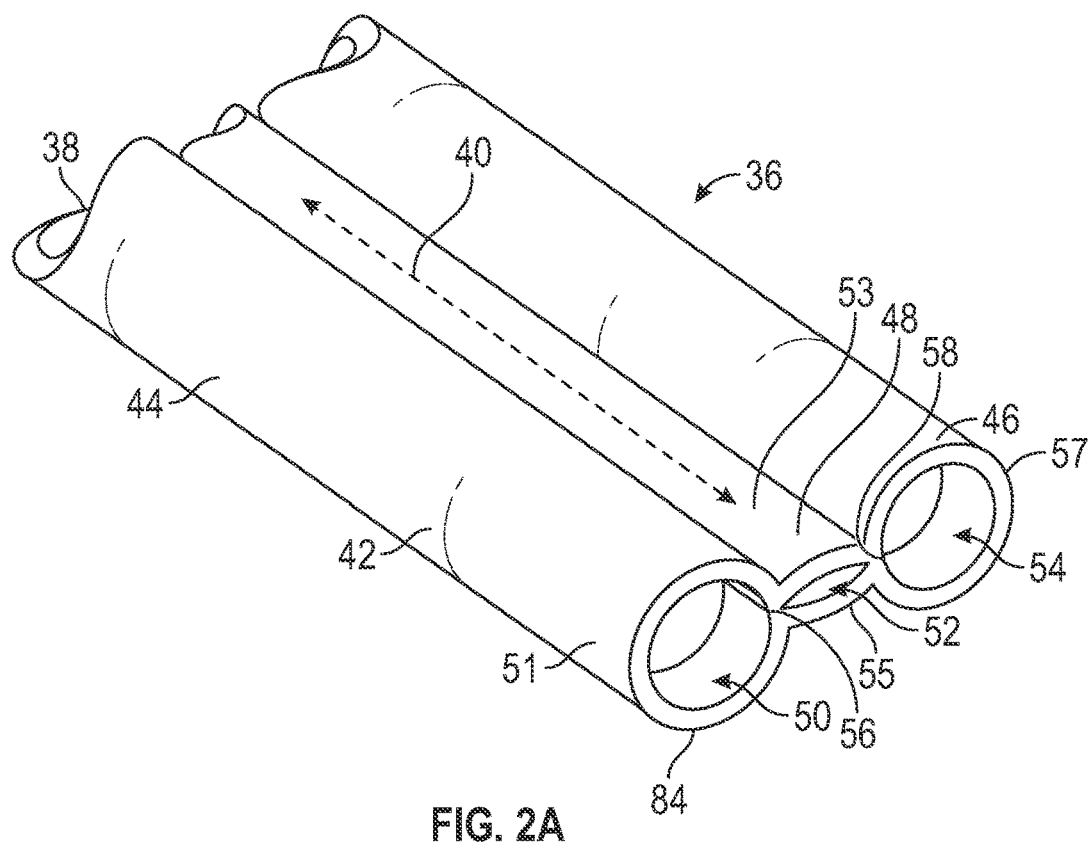
FIG. 2A illustrates a perspective view of a sealer in accordance with an exemplary embodiment.

FIG. 2A illustrates a perspective view of a sealer 36 in accordance with an exemplary embodiment. The sealer 36 is configured to prevent, reduce, minimize, and/or obstruct leakage. In an exemplary embodiment, the sealer includes an exterior wall 38 extending in a longitudinal direction 40 and having an exterior surface(s) 42. As illustrated, the sealer 36 includes end sections 44 and 46 and an intermediate section 48 disposed therebetween. Each of the end sections 44 and 46 and the intermediate section 48 extend in the longitudinal direction 40. Although the sealer 36 is illustrated as having three sections (e.g., end section 44, end section 46, and intermediate section 48), various alternate embodiments of the sealer 36 include the sealer having less than three but at least one section, or more than three sections.

In an exemplary embodiment, the sealer 36 is defined by projection of an I-shaped cross-section (e.g., lateral cross-section) in the longitudinal direction 40 along a length of the sealer 36. As such, in an exemplary embodiment, the intermediate section 48 is relatively thinner than the end sections 44 and 46, which have a relatively larger diameter, dimension, and/or thickness. For example, the thickness of the intermediate section 48 is less than the thickness of the end section 44 and the thickness of the end section 46. Additionally, the thicknesses of the end sections 44 and 46 may be the same, or different from each other. In an exemplary embodiment, the thicknesses of the end sections 44 and 46 are substantially the same.

Figure 2B:
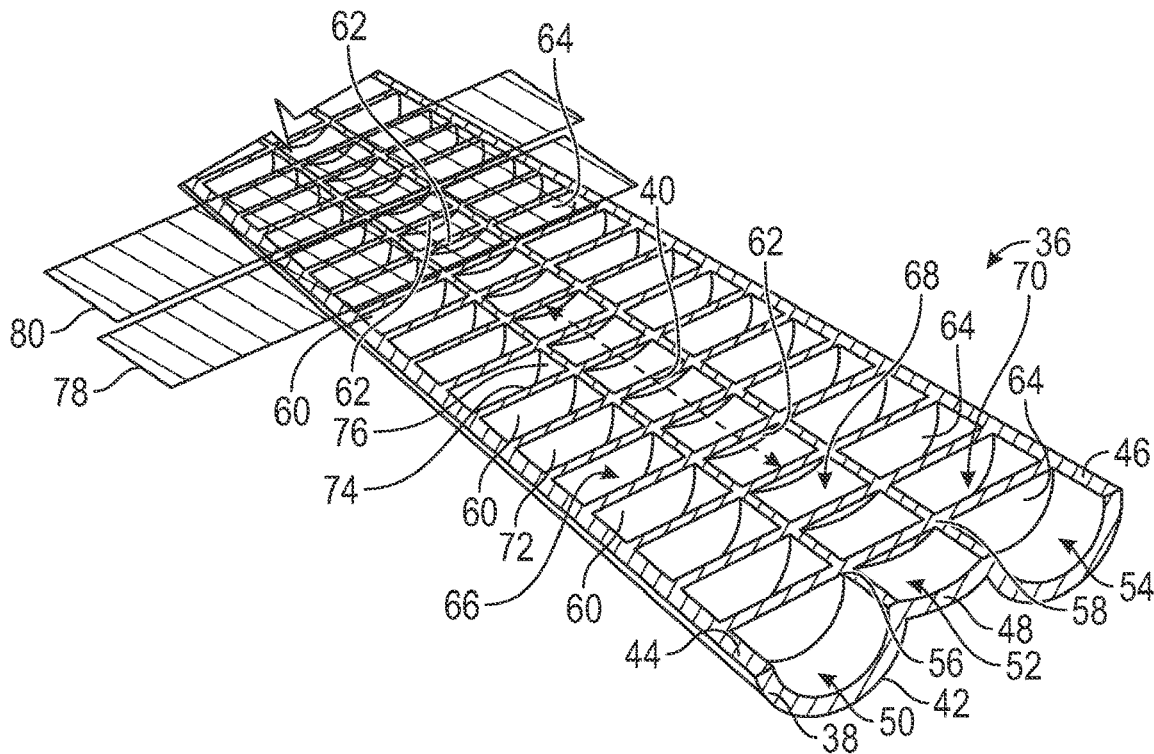
FIG. 2B illustrates a perspective cut-away view of the sealer depicted in FIG. 2A.

Referring also to FIG. 2B, the exterior wall 38 at least partially surrounds channels 50, 52, and 54. In an exemplary embodiment, channel 50 is disposed in end section 44, channel 52 is disposed in intermediate section 48, and channel 54 is disposed in end section 46. Alternate embodiments of the sealer 36 include at least one of the end sections 44, 46 and/or the intermediate section 48 having at least one channel disposed therein while the other end sections 44, 46 and/or the intermediate section 48 may or may not have a corresponding channel(s) disposed therein. As will be discussed in further detail below, other embodiments of the sealer 36 include at least one of the end sections 44, 46 and/or the intermediate section 48 having a plurality of corresponding channels disposed therein while the other end sections 44, 46 and/or the intermediate section 48 may or may not have a plurality of channels, or any channels disposed therein.

Each of the channels 50, 52, and 54, extend alongside each other, separated by intermediately disposed septums 56 and 58. For example, channels 50 and 52 are separated by septum 56 and channels 52 and 54 are separated by septum 58. In an exemplary embodiment, the septum 56 may form at least a portion of the end section 44 and/or the intermediate section 48 and/or the septum 56 may be disposed between the end section 44 and the intermediate section 48. Likewise, the septum 58 may form at least a portion of the intermediate section 48 and/or the end section 46 and/or may be disposed between the intermediate section 48 and the end section 46. As such, the channel 50 is surrounded by section 51 of the exterior wall 38 and the septum 56, the channel 52 is surround by sections 53 and 55 of the exterior wall 38 and the septums 56 and 58, and channel 54 is surrounded by section 57 of the exterior wall 38 and the septum 58.

As illustrated, the sealer 36 includes respective pluralities of interior walls 60, 62, and 64 that are spaced apart from each other and that are disposed in respective channel(s) 50, 52, and 54 extending transverse to the longitudinal direction 40. The interior walls 60, 62, and 64 correspondingly subdivide each of the channel(s) 50, 52, and 54 into corresponding pluralities of cells 66, 68, and 70. For example, the plurality of interior walls 60 are spaced apart from each other in the channel 50 to subdivide the channel 50 into the plurality of cells 66, the plurality of interior walls 62 are spaced apart from each other in the channel 52 to subdivide the channel 52 into the plurality of cells 68, and the plurality of interior walls 64 are spaced apart from each other in the channel 54 to subdivide the channel 54 into the plurality of cells 70. In an exemplary embodiment, each cell in each of the pluralities of cells 66, 68, and 70 are closed cells. In an exemplary embodiment, each of the cells 66, 68, and 70 is a closed volume that is not interconnected or in fluid communication with any of the other cells 66, 68, and 70. As illustrated, each of the cells 66, 68, and 70 is hollow (e.g., empty space) and is enclosed by respective cell walls that define the respective cell 66, 68, or 70 (e.g., cell walls 72, 74, and 76 define cell 66).

In an exemplary embodiment, the interior walls 60 are spaced substantially equidistantly apart from each other, the interior walls 62 are spaced substantially equidistantly apart from each other, and the interior walls 64 are spaced substantially equidistantly apart from each other. Alternatively, one or more of the interior walls in in one or more of the pluralities of interior walls 60, 62, and/or 64 may be spaced non-equidistantly apart from the other interior walls in the respective plurality of interior walls 60, 62, or 64. Additionally, one or more of interior walls 60, 62, 64 may be planarly aligned with laterally adjacent interior walls 60, 62, and/or 64. For example, each interior wall of the plurality of interior walls 60 may be planarly aligned with each interior wall of the plurality of interior walls 62 and each interior wall of the plurality of interior walls 64 (e.g., planes 78 and 80). Alternatively, one or more of the interior walls 60, 62, 64 may off-set, staggered, or otherwise not be planarly aligned with laterally adjacent interior walls 60, 62, and/or 64.

In an exemplary embodiment, the sealer 36 is formed of a polymeric material, such as a relatively flexible polymeric material. In one example, the relatively flexible polymeric material is a silicone, but other flexible polymeric materials may be used, such as, for example, a thermoplastic elastomeric material (TPE), thermoplastic polyurethane material (TPU), or the like. In an exemplary embodiment, the polymeric material remains flexible even in cold temperatures, such as for example the polymeric material remains flexible at about −50° C. up to and beyond room temperature, such as for example 100° C. or greater. For instance, the polymeric material has a glass transition temperature ($T_{(g)}$) of less than about −50° C., such as, for example, from about −55° C. to about −90° C.

In an exemplary embodiment, the sealer 36 meets the flame retardant's requirements as specified in FAR Section 25.853. For example, the polymeric material that forms the sealer 36 may include at least one fire retardant additive.

Figure 3A:
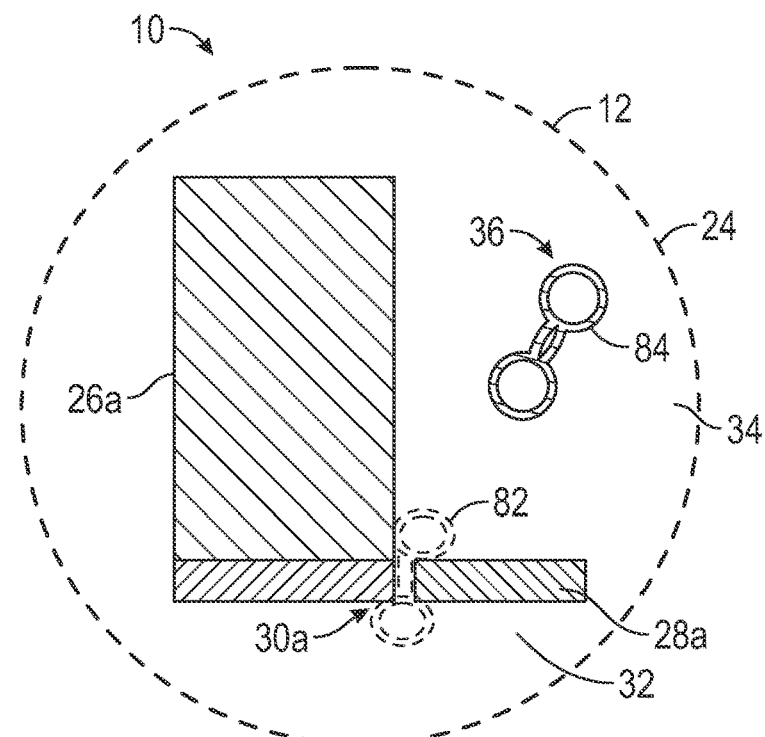
FIG. 3A illustrates a sectional view of disposing a sealer in a gap of an interior portion of an aircraft in accordance with an exemplary embodiment.

Referring also to FIG. 3A, a sectional view of disposing the sealer 36 into the gap 30a of the interior portion 24 of the aircraft 10 in accordance with an exemplary embodiment is provided. In an exemplary embodiment, the gap 30a may change or otherwise vary in size, e.g. width, during different times and/or conditions. For example, the gap 30a may have a different gap size and/or width at ground condition (e.g., when the aircraft 10 is on the ground) than at flight condition (e.g., when the aircraft 10 is in flight). Moreover, the gap size and/or width of the gap 30a may vary during ground condition and/or flight condition, for example, depending on altitude, pressure, and/or temperature.

As illustrated, the sealer 36 is squeezed into or otherwise inserted into the gap 30a, thereby disposing the sealer 36 in the gap 30a in a position 82 (indicated by dashed lines). In an exemplary embodiment, the sealer 36 can expand, contract, and/or deform with changes in the gap size of the gap 30a to provide effective acoustic sealing, thermal sealing, airflow sealing and/or the like, for example, both at ground and flight conditions of the aircraft 10. In an exemplary embodiment, the sealer 36 does not cause any significant stresses on the surrounding structures (e.g., object 26a and object 28) due to its flexibility even during changes in gap size, for example, due to the aircraft 10 being at ground condition versus flight condition.

In an exemplary embodiment, the sealer 36 expands and contracts so that it stays in place to seal the gap 30a regardless of the conditions the aircraft experiences. As such, the sealer 36 arranged in the position 82 in the gap 30a efficiently reduces, minimizes, prevents, and/or obstructed leakage from the interior space(s) 32 and/or 34 from passing through the sealer 36 into the other interior space(s) 32 and/or 34. Further, the internal cell structure of the sealer 36 in combination with the flexibility of the polymeric material from which it is formed allow the sealer 36 to expand or be compressed so that it can be easily squeezed, pushed, or otherwise placed into the gap 30a so that the sealer 36 stays in place between objects 26a and 28a without becoming easily dislodged once it is seated in the gap 30a. In an exemplary embodiment, providing the sealer 36 with an intermediate section 48 having a thickness that is less than the thicknesses of the end sections 44 and 46 helps to fully seal the gap 30a once the sealer 36 is in the position 82.

In an exemplary embodiment, the sealer 36 has an internal cell structure to enhance its flexibility to compress and expand to fit available space. As will be discussed in further detail below, in an exemplary embodiment, the sealer 36 has an exterior shape 84 to facilitate staying in place and forming an airtight seal with the surrounding structures even during changes in the gap size due to the aircraft 10 being at ground condition versus flight condition. In an exemplary embodiment, the sealer 36 can be cut to custom lengths and still maintain its sealing capability, for example, due to its internal cell structure.

Figure 3B:
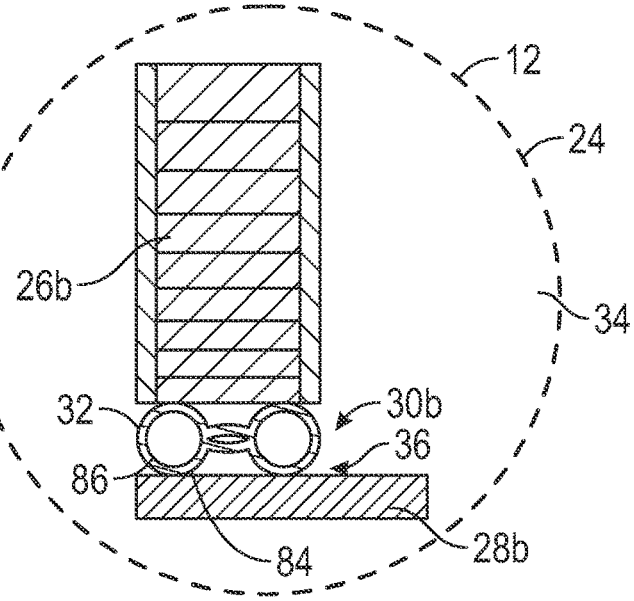
FIG. 3B illustrates a sectional view of disposing a sealer in a gap of an interior portion of an aircraft in accordance with an exemplary embodiment.

Referring also to FIG. 3B, an alternate embodiment of the sealer 36 being disposed in a gap 30b of the interior portion 24 of the aircraft 10 is provided. The gap 30b and the objects 26b and 28b are configured similarly to the gap 30a and the objects 26a and 28a, respectively, except that the objects 26b and 28b are vertically oriented with respect to each other with the gap 30b formed therebetween versus the lateral or horizontal orientation of the objects 26a and 28a with the gap 30a formed therebetween. However, similar to the gap 30a, the gap 30b can change in size, e.g., gap height, etc., during different conditions. In an exemplary embodiment, the sealer 36 is squeezed or otherwise inserted into the gap 30b to dispose the sealer 36 in a position 86 for sealing interfacing with the objects 26b and 28b. In the position 86, in an exemplary embodiment, the sealer 36 provides a double wall or barrier of insulation via end sections 44 and 46. So for example, for acoustic and/or thermal purposes, the double wall of insulation provides better noise, thermal, or the like insulation (e.g., barrier) than single wall of insulation. As such, the sealer 36 may be arranged in the position 86 between objects 26b and 28b to provide the double wall of insulation that advantageously improves the capability to block noise, airflow, or the like from passing through the gap 30b. Accordingly, disposing the sealer 36 in the position 86 in the gap 30b effectively reduces, minimizes, prevents, and/or obstructs leakage from the interior space(s) 32 and/or 34 from propagating through the sealer 36 into the other interior space(s) 32 and/or 34.

In an exemplary embodiment, advantageously the internal cell structure further act as a plurality of walls, barriers, or blockers that block noise, airflow, and/or prevents other leakage from propagating through the sealer 36. Additionally, the internal cell structure allows the sealer 36 to be cut to a customized length such that the sealer 36 still includes at least two or more of the internal walls 60, 62, and/or 64 for blocking leakage from propagating through the sealer 36.

Figure 4A:
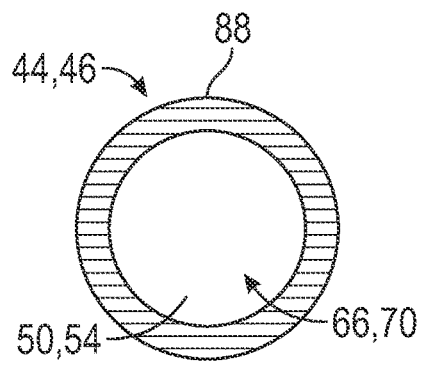
FIGS. 4A-C illustrate various cross-sectional views of interior shapes of end sections of the sealer depicted in FIG. 2A in accordance with exemplary embodiments.
Figure 4B:
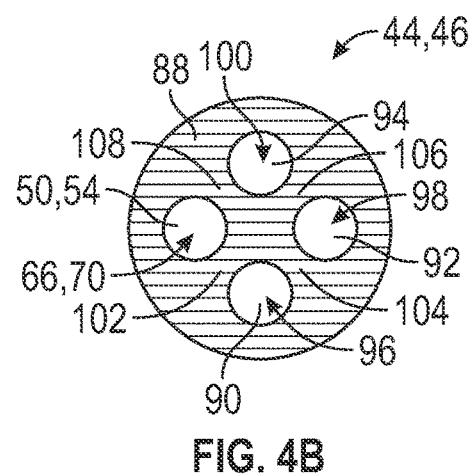
Figure 4C:
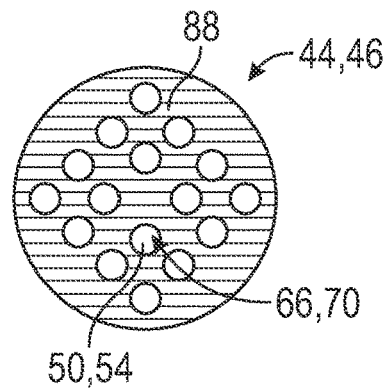

FIGS. 4A-C illustrate various cross-sectional views of interior shapes 88 of the end sections 44 and/or 46 of the sealer 36 depicted in FIG. 2A in accordance with exemplary embodiments. The interior shapes 88 are lateral cross-sections of the end sections 44 and/or 46 that are taken between interior walls of the pluralities of interior walls 60 and/or 64. In an exemplary embodiment, each of the cells in the end sections 44 and 46 are defined by projection of the interior shape 88 in the longitudinal direction 40 between the interior walls of each of the respective pluralities of interior walls 60 and 64. For example, if the interior shape 88 of the end section 44 corresponds to FIG. 4A, then the end section 44 includes the channel 50 subdivided into the plurality of cells 66 by the plurality of interior walls 60. Alternatively, if the interior shape 88 of the end section 44 corresponds to FIG. 4B, then the end section 44 includes the channel 50 as well as additional channels 90, 92, and 94 that run alongside the channel 50 in the longitudinal direction 40 and are subdivided into respective pluralities of cells 66, 96, 98, and 100 by the plurality of interior walls 60. Additionally, septums 102, 104, 106, and 108 are disposed in the end section 44 and the channels 50, 90, 92, and 94 are separated by the septums 102, 104, 106, and 108, respectively. Accordingly, FIGS. 4A and 4B depict embodiments of the sealer 36 having 1 and 4 channels, respectively, in the end section(s) 44 and/or 46 while FIG. 4C depicts an alternate embodiment of the sealer having 16 channels in the end section(s) 44 and/or 46. It is to be understood, therefore, that various embodiments of the sealer 36 include the end section(s) 44 and/or 46 having any number of channels disposed therein.

Figure 5A:
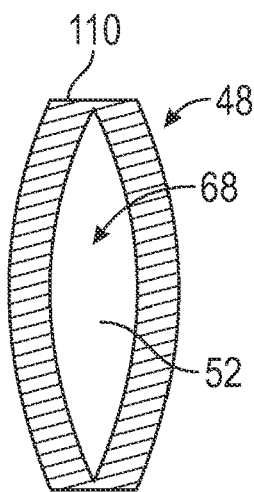
FIGS. 5A-B illustrate various cross-sectional views of interior shapes of an intermediate section of the sealer depicted in FIG. 2A in accordance with exemplary embodiments.
Figure 5B:
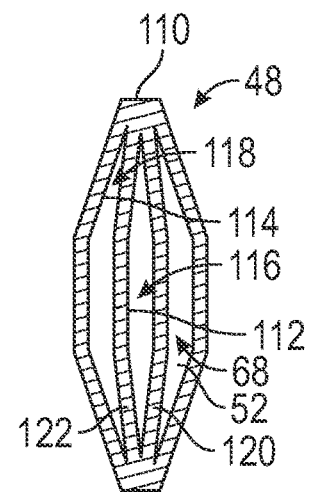

FIGS. 5A-B illustrate various cross-sectional views of interior shapes 110 of the intermediate section 48 of the sealer 36 depicted in FIG. 2A in accordance with exemplary embodiments. The interior shapes 110 are lateral cross-sections of the intermediate section 48 that are taken between interior walls of the plurality of interior walls 62. In an exemplary embodiment, each of the cells in the intermediate section 48 are defined by projection of the interior shape 110 in the longitudinal direction 40 between the interior walls of the plurality of interior walls 62. For example, if the interior shape 110 of the intermediate section 48 corresponds to FIG. 5A, then the intermediate section 48 includes the channel 52 subdivided into the plurality of cells 68 by the plurality of interior walls 62. Alternatively, if the interior shape 110 of the intermediate section 48 corresponds to FIG. 5B, then the intermediate section 48 includes the channel 52 as well as additional channels 112 and 114 that run alongside the channel 52 in the longitudinal direction 40 and are subdivided into respective pluralities of cells 68, 116, and 118 by the plurality of interior walls 62. Additionally, septums 120 and 122 are disposed in the intermediate section 48 and the channels 52, 112, and 114 are separated by the septums 120 and 122, respectively. It is to be understood that various embodiments of the sealer 36 include the intermediate section 48 having any number of channels disposed therein.

Figure 6A:
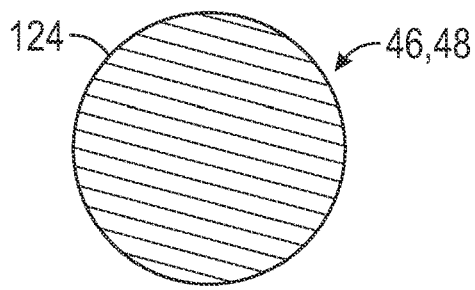
FIGS. 6A-D illustrate various cross-sectional views of exterior shapes of end sections of the sealer depicted in FIG. 2A in accordance with exemplary embodiments.
Figure 6B:
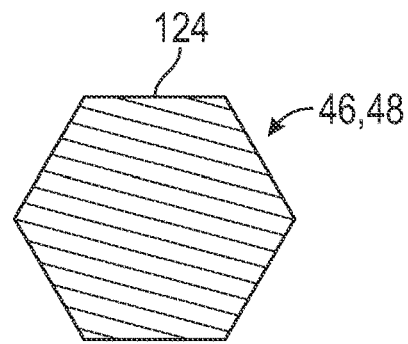
Figure 6C:
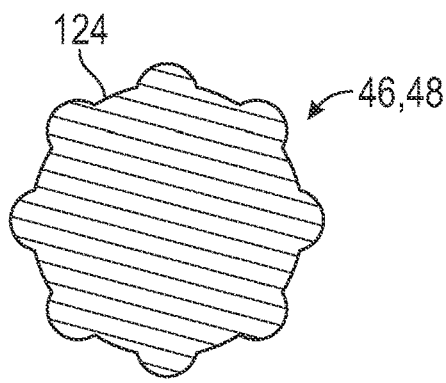
Figure 6D:
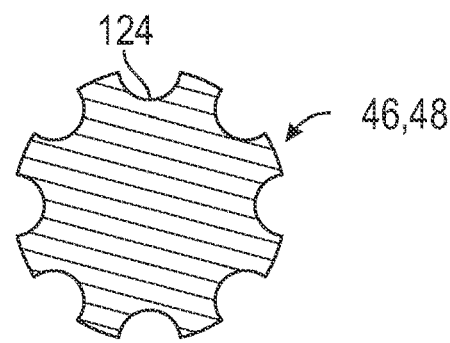

FIGS. 6A-D illustrate various cross-sectional views of exterior shapes 124 of the end sections 44 and/or 46 of the sealer 36 depicted in FIG. 2A in accordance with exemplary embodiments. The exterior shapes 124 are lateral cross-sections of the end section 44 and/or the end section 46 that are taken through an interior wall of the plurality of interior walls 60 and/or 64. As illustrated, the exterior shape 124 of the end sections 44 and/or 46 of the sealer 36 may each be selected from the group of a circular shape (as shown in FIG. 6A), a polygon shape (as shown in FIG. 6B), a circular shape with circumferentially spaced apart arcuate projections (as shown in FIG. 6C), and a circular shape with circumferentially spaced apart arcuate depressions (as shown in FIG. 6D). In an exemplary embodiment, providing the sealer(s) 36 with the end sections 44 and/or 46 having the exterior shapes 124, for example, enhances sealing.

Figure 7A:
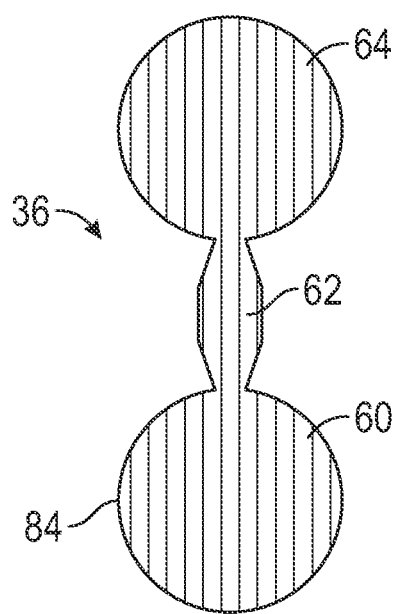
FIGS. 7A-C illustrate various cross-sectional views of exterior shapes of the sealer depicted in FIG. 2A in accordance with exemplary embodiments.
Figure 7B:
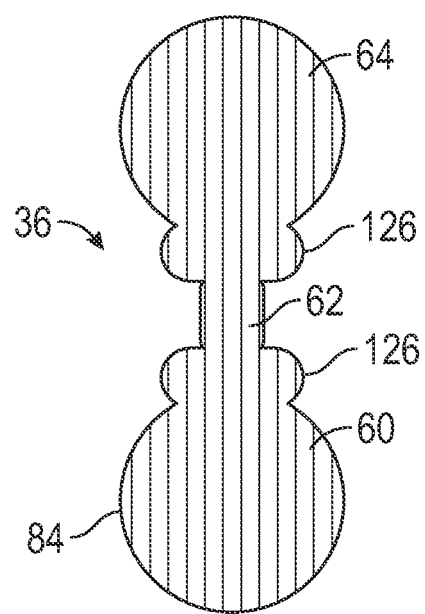
Figure 7C:
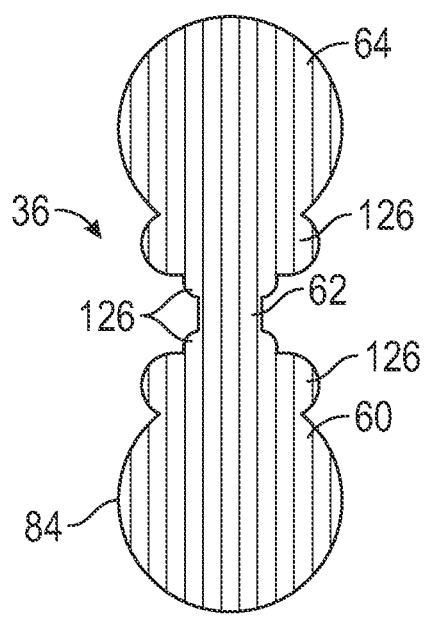

FIGS. 7A-C illustrate various cross-sectional views of exterior shapes 84 of the sealer 36 depicted in FIG. 2A in accordance with exemplary embodiments. The exterior shapes 84 are lateral cross-sections of the sealer 36 that include the interior walls 60, 62, and 64. As illustrated, the sealer 36 may or may not include bobbles 126 (e.g., positive features that extend radially outward from the longitudinal direction 40) to promote sealing capability and tolerance installation variability. In an exemplary embodiment, the bobbles 126 are disposed just inboard of the end sections 44 and 46 adjacent to or along the intermediate section 48. In an exemplary embodiment, advantageously the bobbles 126 ensure that some part of the sealer 36 will always be compressed so that the gap 30a and/or 30b will be sealed, even if there has been some more mobility or changes in the gap size for tolerance variation. In an exemplary embodiment, the bobbles 126 are hollow and include internal walls such as the internal walls of the pluralities of internal walls 60, 62, and/or 64 to define at least a portion of the internal cell structure of the sealer 36.

In an exemplary embodiment, the sealer 36 is formed via an additive process, for example a 3-D printing process, stereolithography, or other additive manufacturing process. As such, the sealer 36 is a monolithic and/or a continuous structure. For example, the pluralities of interior walls 60, 62, and 64 and the exterior wall 38 are formed by the additive process as a singular piece and/or structure.

Figure 8:
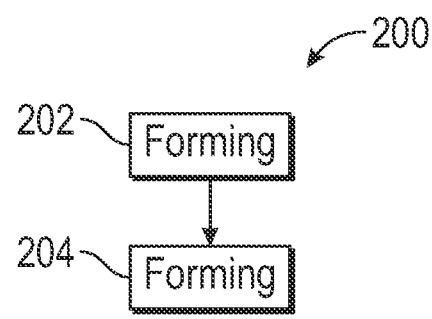
FIG. 8 illustrates a block diagram of a method for making a sealer in accordance with an exemplary embodiment.

FIG. 8 illustrates a method 200 for making a sealer in accordance with an exemplary embodiment. The method 200 includes forming (STEP 202) an exterior wall by an additive process. The exterior wall extends in a longitudinal direction and at least partially surrounds a first channel. A plurality of interior walls is formed (STEP 204) by the additive process. The interior walls are spaced apart from each other and are disposed in the first channel transverse to the longitudinal direction to subdivide the first channel into a first plurality of cells.

In an exemplary embodiment, the additive process is a 3-Dimensional (3-D) printing process. In an exemplary embodiment, the sealer is formed of a polymeric material, for example, a polymeric material selected from the group of thermoplastic elastomeric material (TPE), thermoplastic polyurethane material (TPU), and silicone. In an exemplary embodiment, forming the first plurality of interior walls includes subdividing the first channel into the first plurality of cells configured as closed cells. In an exemplary embodiment, the polymeric material is flexible, having a glass transition temperature ($T_{(o)}$) of about −50° C. or less, such as, for example, from about −55° C. to about −90° C.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A sealer comprising:
an exterior wall extending in a longitudinal direction and at least partially surrounding a first channel; and
a first plurality of interior walls that are spaced apart from each other and that are disposed in the first channel transverse to the longitudinal direction to subdivide the first channel into a first plurality of cells, wherein the sealer is formed of a polymeric material, wherein the polymeric material is flexible, having a glass transition temperature ($T_{(g)}$) of about −50° C. or less.

2. The sealer of claim 1, wherein the first plurality of cells are closed cells.

3. The sealer of claim 1, wherein each cell of the first plurality of cells is hollow.

4. The sealer of claim 1, further comprising a first septum at least partially surrounded by the exterior wall, wherein the exterior wall at least partially surrounds a second channel that extends alongside the first channel separated by the first septum, and wherein the sealer further comprises a second plurality of interior walls that are spaced apart from each other and that are disposed in the second channel transverse to the longitudinal direction so as to subdivide the second channel into a second plurality of cells.

5. The sealer of claim 4, further comprising a second septum at least partially surrounded by the exterior wall, wherein the exterior wall at least partially surrounds a third channel that extends alongside the second channel separated by the second septum, and wherein the sealer further comprises a third plurality of interior walls that are spaced apart from each other and that are disposed in the third channel transverse to the longitudinal direction so as to subdivide the third channel into a third plurality of cells.

6. The sealer of claim 5, wherein the sealer has a first end section, a second end section, and an intermediate section disposed therebetween, wherein the first end section, the second end section, and the intermediate section extend in the longitudinal direction, and wherein the first channel is disposed in the first end section, the second channel is disposed in the intermediate section, and the third channel is disposed in the second end section.

7. The sealer of claim 6, wherein the first end section has a first thickness, the intermediate section has a second thickness, and the second end section has a third thickness, and wherein the second thickness is less than the first thickness and the third thickness.

8. The sealer of claim 7, wherein the first end section has a first lateral cross-section that has a first outer shape selected from the group of a circular shape, a polygon shape, a circular shape with circumferentially spaced apart arcuate projections, and a circular shape with circumferentially spaced apart arcuate depressions.

9. The sealer of claim 8, wherein the second end section has a second lateral cross-section that has a second outer shape selected from the group of a circular shape, a polygon shape, a circular shape with circumferentially spaced apart arcuate projections, and a circular shape with circumferentially spaced apart arcuate depressions.

10. The sealer of claim 9, wherein the sealer has a third lateral cross-section that has a third outer shape that is generally I-shaped.

11. The sealer of claim 6, wherein the first septum separates the first channel in the first end section and the second channel in the intermediate section, and wherein the second septum separates the third channel in the second end section and the second channel in the intermediate section.

12. The sealer of claim 11, further comprising a third septum disposed in the first end section and the exterior wall at least partially surrounding a fourth channel that extends alongside the first channel separated by the third septum.

13. The sealer of claim 12, further comprising a fourth septum disposed in the intermediate section extending in the longitudinal direction and the exterior wall at least partially surrounding a fifth channel that extends alongside the second channel separated by the fourth septum.

14. A method for making a sealer, the method comprising the steps of:
forming an exterior wall by an additive process, the exterior wall extending in a longitudinal direction and at least partially surrounding a first channel; and
forming a plurality of interior walls by the additive process, wherein the interior walls are spaced apart from each other and are disposed in the first channel transverse to the longitudinal direction to subdivide the first channel into a first plurality of cells.

15. The method of claim 14, wherein the additive process is a 3-Dimensional (3-D) printing process.

16. The method of claim 14, wherein forming the first plurality of interior walls includes subdividing the first channel into the first plurality of cells configured as closed cells.

17. The method of claim 14, wherein the sealer is formed of a polymeric material that includes at least one fire retardant additive.

18. The method of claim 17, wherein the polymeric material is flexible, having a glass transition temperature ($T_{(g)}$) of about −50° C. or less.

* * * * *